United States Patent [19]

Green et al.

[11] 3,916,008

[45] Oct. 28, 1975

[54] BIOLOGICALLY ACTIVE SUBSTANCES

[75] Inventors: Joseph Green, Wimbledon; Keith Howard Baggaley; Brian Morgan, both of Reigate, all of England

[73] Assignee: Beecham Group Limited, England

[22] Filed: Nov. 15, 1972

[21] Appl. No.: 306,791

[30] Foreign Application Priority Data
Dec. 18, 1971  United Kingdom............... 58930/71

[52] U.S. Cl.............. 260/477; 260/468 R; 260/472; 260/473 R; 260/482 C; 260/490; 424/300; 424/307
[51] Int. Cl.$^2$.................. C07C 93/18; C07C 93/20
[58] Field of Search..................................... 260/477

[56] References Cited
UNITED STATES PATENTS

| 2,260,384 | 10/1941 | Kritchevsky ......................... | 260/477 |
| 2,697,118 | 12/1954 | Lundsted et al. .................... | 260/584 |
| 3,009,884 | 11/1961 | Monson et al. ...................... | 252/341 |

FOREIGN PATENTS OR APPLICATIONS
762,490  3/1971  Belgium

OTHER PUBLICATIONS

Stanton, American Perfumer, Vol. 72, No. 4, pp. 54, 56 & 58, (1958).
Shriner et al., The Systematic Identification of Organic Compounds, 4th Ed., pp. 206–208, (1956).

*Primary Examiner*—Robert Gerstl
*Assistant Examiner*—E. Jane Skelly

[57] ABSTRACT

Certain novel esters of a specific group of non-ionic surfactants are useful as hypocholesterolaemic agents in animals and man. The compounds have a nucleus based on ethylene diamine and ($C_2H_4O$) groups accounting for 0 to 30% of the total molecular weight and ($C_3H_6O$) groups having a partial molecular weight of from 2250 to 3250. The esters may be formed from aliphatic, aromatic, amino-aliphatic or amino-aromatic acids.

6 Claims, No Drawings

BIOLOGICALLY ACTIVE SUBSTANCES

The present invention relates to a new class of compounds which are of value as agents for the control and reduction of serum lipid levels in animals and man.

Several chronic degenerative diseases — of which the most important is atherosclerosis, and its sequel ischaemic heart disease — have been associated, at least in part, with raised serum lipid levels, especially cholesterol and triglyceride levels.

Cholesterol is the predominant sterol in higher mammals. It is present in all animal tissues so that some cholesterol is present in all foods of animal origin. In addition, endogenous production of cholesterol takes place in the body, mainly in the liver. There are drugs which can inhibit this process but most of such treatments are not without harmful side-effects. Another way to lower serum cholesterol in animals and man is to inhibit the absorption of cholesterol from the gastro-intestinal track. Such cholesterol may be either dietary in origin or may be metabolic.

We have described in our W. German Offenlegungsschrift No. 2106156 the use of a group of non-ionic surfactants as hypocholesterolaemic agents. In particular a pharmaceutical composition is claimed therein which comprises at least one-ionic surfactant of the general formula (I):

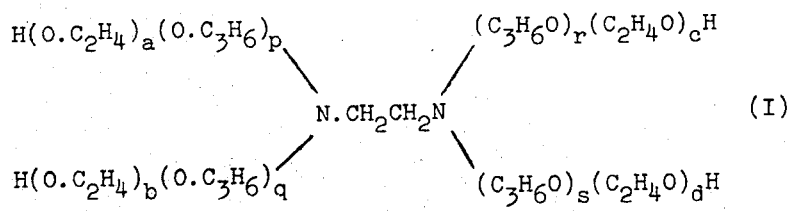

wherein $a, b, c, d, p, q, r$ and $s$ are integers such that the $(C_2H_4O)$ groups account for from 0 to 30% of the total molecular weight while the partial molecular weight due to the $(C_3H_6O)$ groups is from 2250 to 3250, together with one or more pharmaceutically acceptable carriers said surfactant comprising at least 20% by weight of the total composition.

We have now found that a class of esters of the compounds of formula (I) with mono-carboxylic acids are useful as agents for the control of serum cholesterol levels in animals and man. Although the compounds represented by formula (I) have good hypocholesterolaemic activity, the esters of the present invention provide an improvement in that they are substantially less toxic than the unesterified compounds, and therefore more applicable to use as medicaments.

Certain ester of oxyalkylated derivatives, including those of formula (I) above, with polycarboxylic acids are disclosed in U.S. Pat. No. 3,009,884 as being useful for the breaking of emulsions of the oil-in-water class. However that Patent does not disclose any esters made with mono-carboxylic acids.

According to the present invention, there is provided esters of general formula (II):

wherein $a, b, c, d, p, q, r$ and $s$ are integers as defined with reference to formula (I) above and $R_1, R_2, R_3$ and $R_4$ are the same or different and each is hydrogen or an alkyl, cycloalkyl, aryl, substituted aryl, aralkyl, substituted aralkyl, alkylamino or arylamino group.

Common examples of the groups $R_1, R_2, R_3$ and $R_4$ include: lower alkyl groups e.g. -methyl, ethyl, n- and iso-propyl, n-, iso-, and tert- butyl; lower cycloalkyl groups e.g. cyclopentyl and cyclohexyl; phenyl; phenyl substituted with one or more methoxy or ethoxy groups; benzyl; substituted benzyl; lower alkylamino, e.g. methylamino, ethylamino, n- and iso-propylamino, n-, iso-, and tert-butylamino; phenylamino; and substituted phenylamino.

The term 'lower' used herein is intended to include groups containing from 1 – 6 carbon atoms.

Although the present invention includes mono-, di, tri, and tetra-esters of the group of compounds depicted in I, preferred compounds are the tetra- esters wherein $R_1, R_2, R_3$ and $R_4$ in formula (II) are the same and designated by R. For the remainder of this specification, these esters will be emphasised, but it is to be understood that this does not restrict the invention to this class of compounds. It is preferable that in the compounds of this invention the $(C_2H_4O)$ groups account for at least 5% of the total molecular weight.

One group of esters which is included within this invention includes esters of the surfactant sold under the Trade name "Tetronic 701" and manufactured by Wyandotte Chemicals Corporation of Wyandotte, Mich. 48192, U.S.A. which has the formula (I) shown above wherein the $(C_2H_4O)$ groups account for about 10% (i.e. between 5 and 15%) of the total molecular weight and the partial molecular weight due to the $(C_3H_6O)$ groups is about 2750 (i.e. between 2500 and 3000).

Similarly, the surfactant sold under the name "Tetronic 702" and manufactured again by Wyandotte Chemicals Corporation has the formula (I) above wherein the $(C_2H_4O)$ groups account for about 25% (i.e. between 20 and 30%) of the total molecular weight and the partial molecular weight due to the $(C_3H_6O)$ groups is about 2750 (i.e. between 2500 and 3000). Consequently esters (of formula (II)) of "Tetronic 702" are also included within the scope of the present invention. It will be realised that the total molecular weight of the groups $R_1, R_2, R_3$ and $R_4$ is not significant compared to the total molecular weight of the polymer.

Particularly interesting esters falling within the general formula (II) include the following tetraacetate, tetra-cyclohexanoate, tetra-benzoate; tetra-2,6-dimethox-

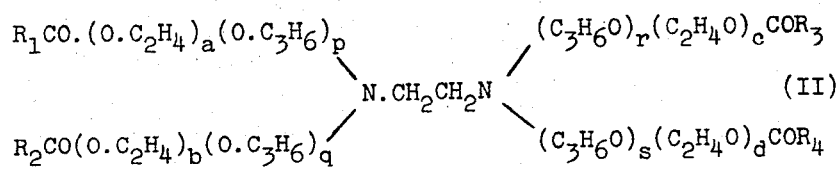

ybenzoate, tetra-(ethyl carbamate); tetra-(phenylcarbamate). The tetra-benzoate is a preferred compound within this class.

The present invention also provides a process for the preparation of esters of general formula (III)

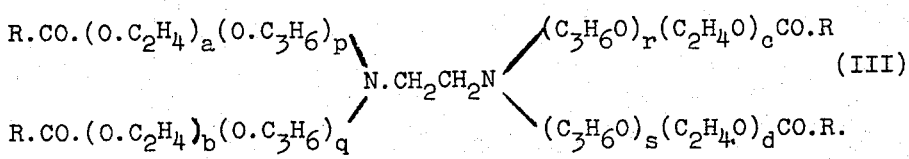

wherein $a,b,c,d,p,q,r,s$ are integers as defined with reference to formula (I) above and R is hydrogen or an alkyl, cycloalkyl, aryl, substituted aryl, aralkyl, substituted aralkyl, alkylamino or arylamino group, which process comprises reacting a surfactant of formula (I) or a salt thereof, where $a,b,c,d,p,q,r,s$ are as hereinbefore defined with reference to formula (I) with a reactive derivative of the appropriate carboxylic acid (IV)

where R is as hereinbefore defined.

When the group R in formula (IV) is an alkyl, cycloalkyl, aryl, or substituted aryl group, the said reactive derivative may be an acid halide, e.g. the chloride or bromide; an acid anhydride; mixed anhydride with other carboxylic acids; or the carboxylic acid itself.

When the group R is an alkylamino or arylamino group, the reactive derivative may be an isocyanate of the general formula (V)

wherein R' is the appropriate alkyl or aryl group; or the corresponding carbamic acid (VI):

The reaction may conveniently be carried out in solution of an organic base such as triethylamine, such that there is at least four molar equivalents of the base present to one of the non-ionic surfactant.

The compounds of this invention represented by formula (II) above wherein $R_1$, $R_2$, $R_3$ and $R_4$ are not all the same may be similarly prepared from compounds of formula (I) by partial esterification with reactive derivatives of two or more carboxylic acids selected from the group comprising: $R_1CO_2H$, $R_2.CO_2H$, $R_3.CO_2H$, and $R_4CO_2H$. Each said reactive derivative is reacted with the compound of formula (I) sequentially to produce esters of formula (II) having at least two of the groups $R_1$, $R_2$, $R_3$ and $R_4$ different from each other. It will be realised that the product from such a process will be a mixture of esters having different relative proportions of the groups $R_1$, $R_2$, $R_3$ and $R_4$. Such a mixture is not readily separated into its constituent esters, but it is useful itself as a hypocholesterolaemic agent within the present invention.

A further aspect of the present invention provides a pharmaceutical composition comprising at least one ester of the general formula (II) wherein $a$, $b$, $c$, $d$, $p$, $q$, $r$, $s$ and $R_1$, $R_2$, $R_3$ and $R_4$ are as hereinbefore described with reference to formula (I) and formula (II) respectively together with one or more pharmaceutically acceptable carriers.

As is common practice, such compositions will usually be accompanied by or associated with written or printed directions for use in the medical treatment concerned, in this case, as an agent for controlling or reducing serum cholesterol and/or for use in the prevention or treatment of atherosclerosis.

In forming the novel compositions of this invention, the compound is incorporated in a suitable carrier such as, for example, a pharmaceutical carrier, beverage or foodstuff. The compositions may take the form of tablets, linguets, powders, capsules, slurries, troches or lozenges. Any suitable pharmaceutical carrier may be used for formulating solid compositions such as, for example, magnesium stearate, starch, lactose, glucose, sucrose, rice flour, talc and chalk. The composition may also be in the form of an ingestible capsule (e.g. of gelatin) to contain the compound; or in the form of a syrup, a liquid solution or a suspension. Suitable liquid pharmaceutical carriers include ethyl alcohol, glycerine, saline and water together with flavouring or colouring agents to form syrups. Also the compound may be incorporated in a foodstuff such as, for example, in combination with biscuits.

Also included within the scope of the present invention is a method for controlling or reducing the serum lipid levels of animals, including man which method comprises the administration to the animal or man of one or more of the esters defined above An oral administration is preferred.

The ester or esters may be administered alone in combination with one or more pharmaceutically acceptable carriers, or as part of the total dietary intake. In the latter case, the amount of said ester employed may be less than 1% by weight of the diet and is preferably no more than 0.5% by weight. The diet for a man may consist of normal foodstuffs to which the ester has been added, and similarly the diet for animals may consist of foodstuffs and the ester may be added alone or with a premix.

In order to achieve an effective degree of serum-cholesterol lowering, the compound should preferably be administered to the animal or patient in an amount of from 1 to 10 g. per day; generally it will be most convenient to spread the daily dosage by giving several smaller, more palatable doses.

The invention will now be further illustrated in the following Examples:

EXAMPLE 1 a. Tetra-benzoate of "Tetronic 701"

One molar equivalent of Tetronic 701 (supplied by Wyandotte Chemicals Corporation) was treated with 5 molar equivalents of triethylamine and 4.5 molar equivalents of benzoylchloride. After 15 minutes at room temperature, the mixture was heated at 100° for 2 hours. The reaction mixture was then cooled, diluted with ether, filtered and the filtrate evaporated. Excess reagents were removed from the involatile product by heating at 150°/1mm. The process was repeated until complete esterification is achieved as indicated by infra-red spectroscopy.

The following tetra-esters of Tetronic 701 were also prepared by this method:
   b. Tetra-cyclohexanoate
   c. Tetra-acetate
   d. Tetra-(2,6-dimethyl benzoate).

EXAMPLE 2 a. Tetra-(ethyl carbamate) of "Tetronic 701"

One molar equivalent of Tetronic 701 (supplied by Wyandotte Chemicals Corporation) dissolved in dry isopropyl ether containing 1% triethylamine was treated dropwise with 6 molar equivalents of ethyl isocyanate. The mixture was stirred at room temperature overnight. Removal of the precipitate and concentration of the filtrate under vacuum yielded the tetra-(ethyl carbamate) derivative. (b) The tetra-(phenyl carbamate) of "Tetronic 701" was prepared by the method described in Example 2a. above.

EXAMPLE 3

The hypocholesterolaemic effect of esters of the invention was demonstrated in the following experiment.

Groups of 10 male albino rats (CFY strain), weighing approximately 150g were given a semisynthetic hypercholesterolaemic diet containing 63% sucrose, 10% hydrogenated coconut oil, 20% casein, 1% cholesterol and 0.5% ox bile extract, with and without the drug at 0.1% in the diet for 2 weeks. The rats were then killed and their serum total cholesterol was measured by the Technicon Autoanalyzer method N24A.

Table 1 shows the result of the experiment and demonstrates the cholesterol-lowering effect of the esters shown.

TABLE 1

| Addition to Diet | Serum cholesterol (mg/100ml ± S.E.M.*) |
|---|---|
| Experiment 1 | |
| None | 309 ± 39 |
| Tetra-acetate ester | 145 ± 37 |
| Experiment 2 | |
| None | 397 ± 53 |
| Tetra-cyclohexanoaxe Ester | 128 ± 10 |
| Tetra-benzoate ester. | 119 ± 8 |
| Tetra-ethyl carbamate ester. | 123 ± 7 |
| Tetra-phenyl carbamate ester. | 241 ± 36 |
| Tetra-(2,6-dimethyl benzoate) | 290 ± 36 |
| Unesterified tetronic 701 | 206 ± 33 |

*Standard error of mean. All reductions of serum cholesterol are statistically significant ($p<0.05$).

EXAMPLE 4

Soft gelatin coated capsules were each filled with 500mg. of the tetra-benzoate of Tetronic 701 and were used for oral administration to humans.

EXAMPLE 5

Tablets were prepared in the usual way each to contain 250 mg. of the tetra-benzoate of Tetronic 701 together with starch talc, lactose or magnesium stearate to give tablets weighing 600 mg., again for oral administration to humans.

EXAMPLE 6

Toxicological data on Tetronic 701 tetrabenzoate.

a. Acute oral toxicity determination in rats.

The tetrabenzoate, dissolved in methyl cellulose solution was dosed orally to male and female rats and the median lethal dose ($LD_{50}$) was compared to that of the unesterified Tetronic 701:

|  | $LD_{50}$ |
|---|---|
| tetrabenzoate | >10,000 mg/kg. |
| Tetronic 701 | 4,700 mg/kg |

Furthermore no target organ or mode of toxic action was indicated for the tetrabenzoate.

Also, the tetrabenzoate, suspended in water was dosed orally to 5 male rats at levels of 10,000 and 6,000 mg/kg. No adverse signs or deaths occurred in the ensuing 14 days observation period and it is therefore concluded that the $LD_{50}$ value of an aqueous suspension of the tetrabenzoate by this route in the rat is greater than 10g/kg.

b. Acute oral toxicity determination in mice

The tetrabenzoate, dissolved in methylcellulose solution was dosed orally to male and female mice and the $LD_{50}$ value again compared to that of the unesterified Tetronic 701:

|  | $LD_{50}$ |
|---|---|
| tetrabenzoate | >10,000 mg/kg |
| Tetronic 701 | 4,300 mg/kg | c. Maximum tolerated dose study in the dog

Dosing to 1 Beagle dog of each sex with the tetrabenzoate was elevated from 400mg/kg to 8,000mg/kg at 4 day intervals over a period of 16 days.

The tetrabenzoate was tolerated at levels up to and including 2,000 mg/kg. Subsequent elevation of the dose causes appetite suppression and precipitous weight loss.

We claim:

1. A compound of formula:

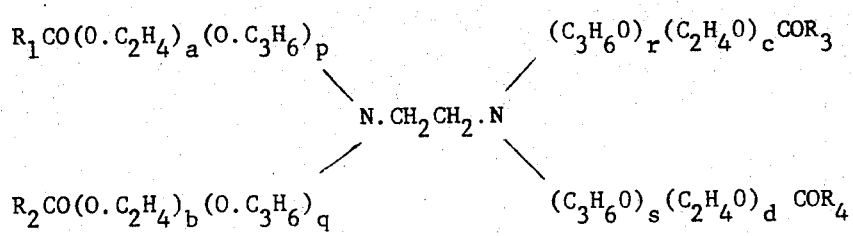

wherein $a,b,c,d,p,q,r$ and $s$ are integers such that the ($C_2H_4$) groups account for from 0 to 30% of the total molecular weight while the partial molecular weight due to the ($C_3H_6O$) groups is from 2250 to 3250, and $R_1$, $R_2$, $R_3$ and $R_4$ are the same or different and each is $C_{1-6}$ alkyl substituted by phenyl; or phenyl.

2. A compound as claimed in claim 1 wherein the ($C_2H_4O$) groups account for at least 5% of the total molecular weight.

3. A compound as claimed in claim 1 wherein the ($C_2H_4O$) groups account for between 5 and 15% of the total molecular weight and the partial molecular weight due to the ($C_3H_6O$) groups is between 2,500 and 3,000.

4. A compound as claimed in claim 1 wherein the ($C_2H_4O$) groups account for between 20 and 30% of the total molecular weight and the partial molecular weight due to the ($C_3H_6O$) groups is between 2,500 and 3,000.

5. A compound according to claim 1 wherein $R_1$, $R_2$, $R_3$ and $R_4$ are $C_1$-$C_6$ alkyl substituted by phenyl.

6. A compound according to claim 1 wherein each of $R_1$, $R_2$, $R_3$ and $R_4$ are phenyl.

* * * * *